April 1, 1952  R. H. DAVIS  2,591,339
APPARATUS FOR CASEHARDENING DRILL RODS
Filed Dec. 30, 1948  5 Sheets-Sheet 1
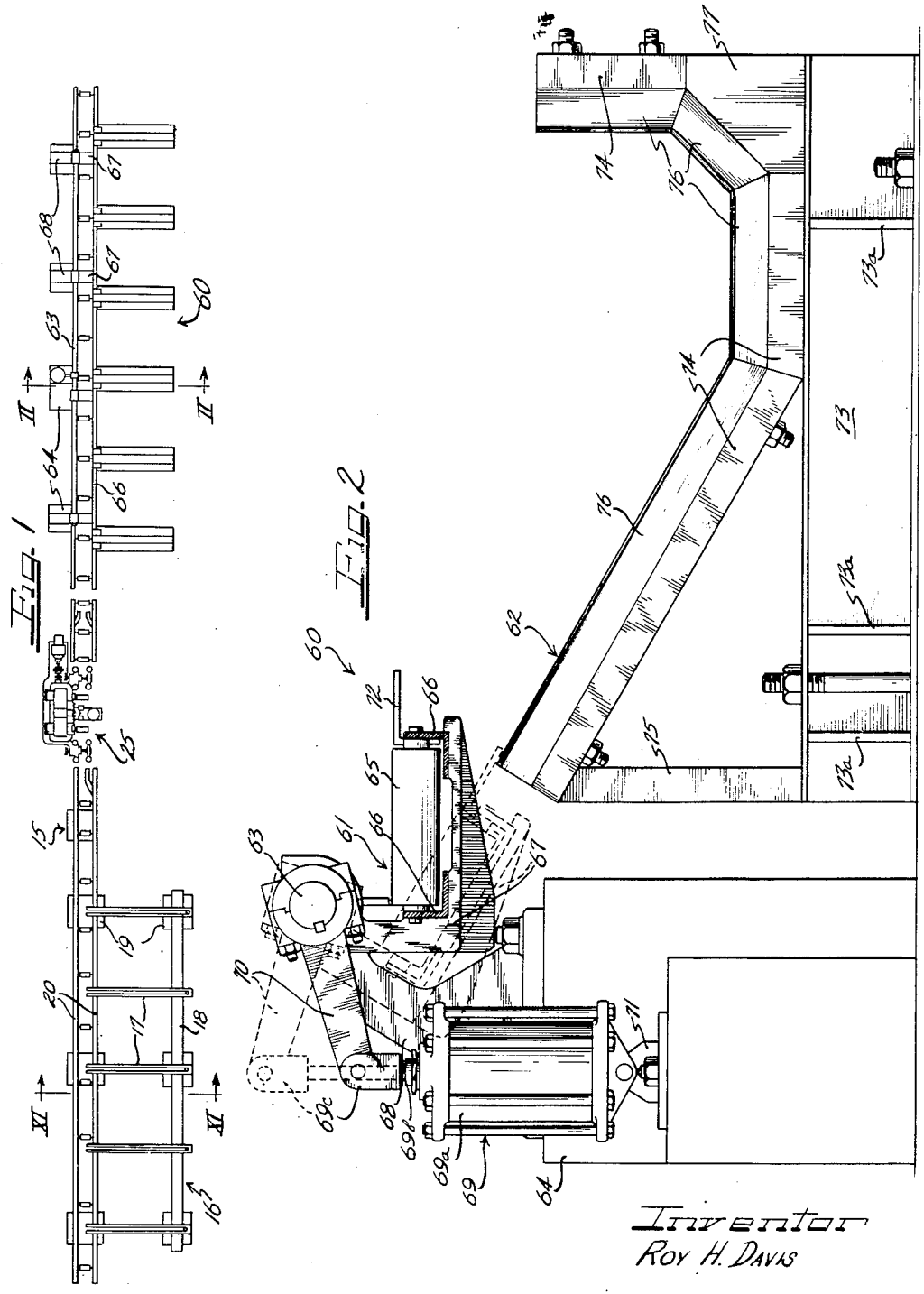
Inventor
Roy H. Davis
by The Firm of Charlesworth Hill Attys.

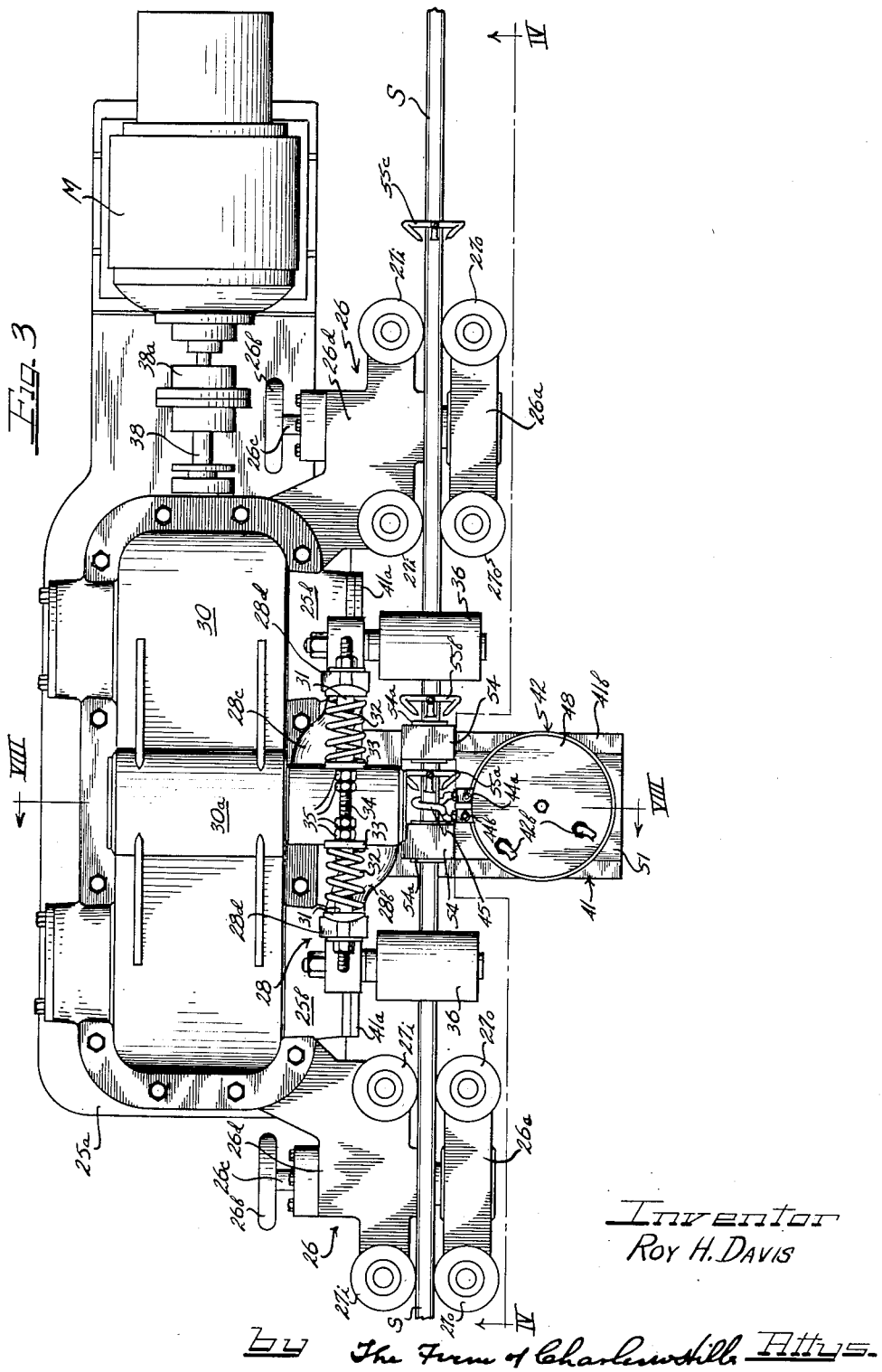

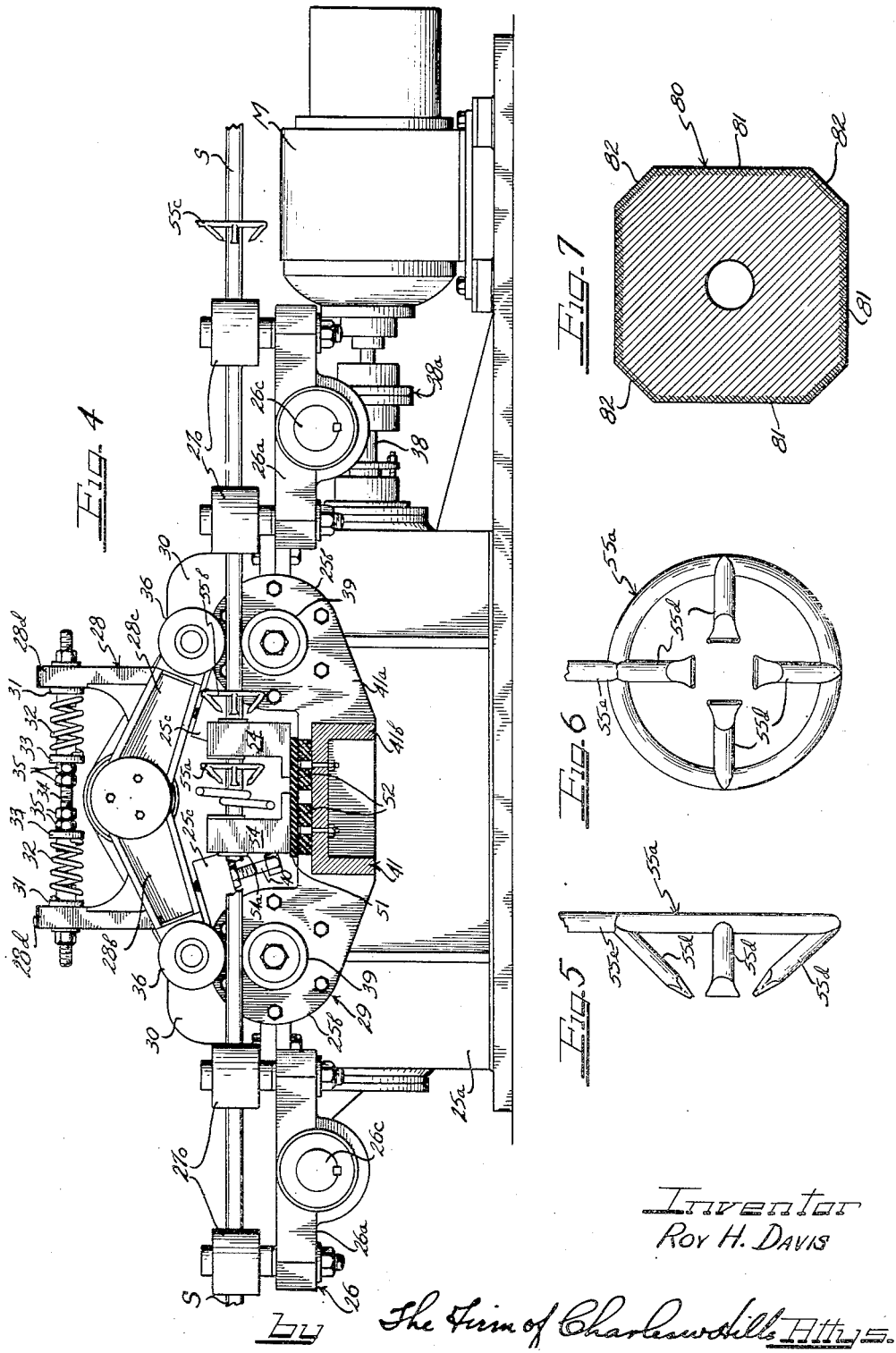

April 1, 1952 R. H. DAVIS 2,591,339
APPARATUS FOR CASEHARDENING DRILL RODS
Filed Dec. 30, 1948 5 Sheets-Sheet 4
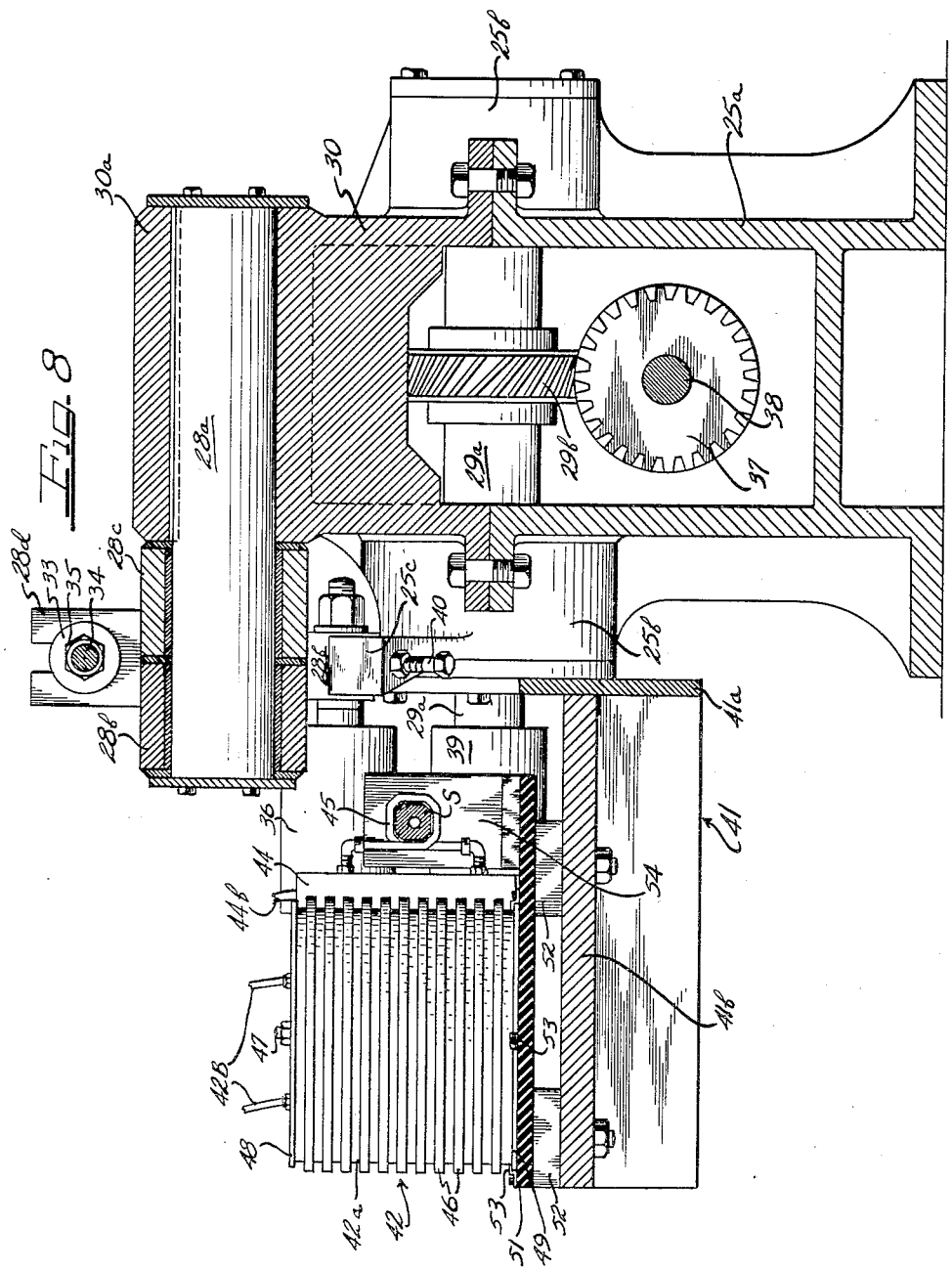
Inventor
Roy H. Davis
by The Firm of Charles W. Hill Attys.

April 1, 1952 — R. H. DAVIS — 2,591,339
APPARATUS FOR CASEHARDENING DRILL RODS
Filed Dec. 30, 1948 — 5 Sheets-Sheet 5
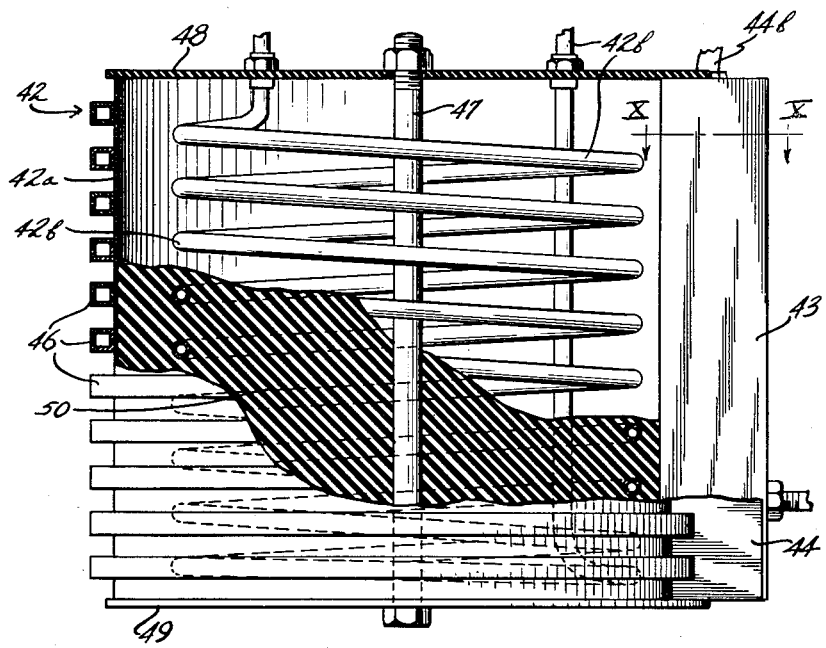
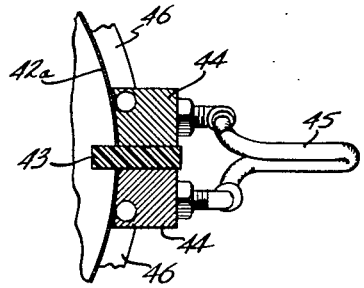
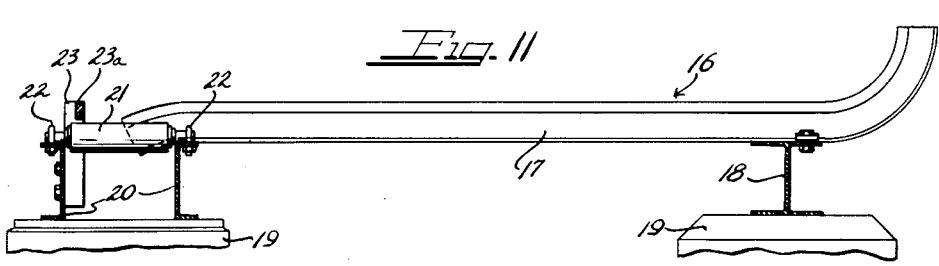
Inventor
Roy H. Davis Patented Apr. 1, 1952

2,591,339

UNITED STATES PATENT OFFICE 2,591,339

APPARATUS FOR CASEHARDENING DRILL RODS

Roy H. Davis, Fonthill, Ontario, Canada, assignor to Atlas Steels Limited, Welland, Ontario, Canada, a limited company of Canada Application December 30, 1948, Serial No. 68,355

3 Claims. (Cl. 219—13)

This invention relates to an apparatus for surface hardening metal bar stock and the like, and more particularly relates to a novel high frequency inductive heating apparatus and to novel processes performed thereby.

In mining operations, excavating, road work and other closely allied pursuits, a power device employing a shank with a cutting bit on one end is frequently used to break the minerals, or the rock and other material, peculiar to the particular operation. The service characteristics of the cutting tool are of primary consideration, and to that end, a hollow drill rod is usually employed which forms a shank having a central water passage extending therethrough. A suitable bit is provided at one end of the shank. The water passage operates to wash out the material on the bit end of the shank, helps to reduce the operating temperature of the cutting edge of the bit and minimizes the occupational hazard of silicosis by keeping the dust resulting from the work operation wetted down.

One of two general practices is customarily followed with respect to the form of shank and cutting bit used. One practice is to upset the end of a piece of drill rod, forge it into proper shape and then harden the surface by a suitable heating and quenching operation.

A second practice which seems to be less satisfactory from an operation standpoint is to use a detachable bit fixed on the end of a drill rod shank.

One of the greatest difficulties encountered by the producers of hollow drill rods in serving industries which use bits and shanks has been the problem of obtaining a sufficiently hard wearing surface on the cutting edge, or bit, without materially reducing fatigue life of the body or shank. Unfortunately, cutting tools having favorable wearing characteristics have frequently suffered a high percentage of fatigue failures, and consequently, manufacturers have had to produce larger and heavier drill rods than would otherwise be necessary.

One of the principal features and objects of the present invention is, therefore, to provide a novel process and novel apparatus for surface hardening bar stock and the like without materially lowering the fatigue life of the material.

A further object of this invention is to provide a novel and improved high frequency inductive heating apparatus for surface hardening metal objects.

Another object of this invention is to provide a new method of case hardening bar stock by a high frequency inductive method whereby the fatigue life of the stock is not materially reduced.

A further object of this invention is to provide a novel and improved transformer construction for use in high frequency induction heating apparatus.

Another object of this invention is to provide a heat treating device having new and improved means of heating bar stock by a high frequency inductive method and new and improved means for quenching the heated material.

A further object of this invention is to provide an induction coil construction in a high frequency induction apparatus having novel and improved characteristics which make it especially desirable for heat treatment of shaped bar stock.

Another object of this invention is to provide a high frequency inductive surface hardening apparatus with novel and improved handling mechanism associated therewith suitable for conveniently and rapidly subjecting lengthy pieces of bar stock to a surface hardening process.

A further object of this invention is to provide an improved automatic tray or table construction peculiarly well adapted for receiving a lengthy bar stock unit and operable to pivotally tilt downwardly from a centerline axis for ejecting bar stock units onto a storage receptacle adjacent thereto.

Another object of this invention is to provide a novel method of surface hardening lengthy bar stock whereby hardness penetration is controlled by varying the linear speed of the stock as it passes through a high frequency inductive field and through subsequent quenching areas.

The exact nature of my invention and many other objects thereof will become evident to those skilled in the art by referring to the following detail description and the accompanying drawings in which:

Figure 1 is a plan view of a heat treating apparatus embodying the principles of my invention;

Figure 2 is a cross-sectional view taken on line II—II of Figure 1;

Figure 3 is an enlarged fragmentary plan view showing the detail construction of the high frequency induction apparatus and the quenching mechanism as embodied in the heat treating apparatus;

Figure 4 is an elevational view with a portion of the apparatus broken away, as viewed along line IV—IV of Figure 3;

Figure 5 is an enlarged fragmentary view showing a quenching unit in side elevation;

Figure 6 is a front elevational view of the quenching unit shown in Figure 5;

Figure 7 is a magnified cross-sectional view of a piece of bar stock sectioned to show the structural changes accompanying surface hardening when bar stock is treated in accordance with the present invention;

Figure 8 is a view, partly in section, taken on line VIII—VIII of Figure 3;

Figure 9 is an enlarged fragmentary view, partly in section, and partly broken away, of a transformer construction forming a part of the present invention;

Figure 10 is a cross-sectional view taken on line X—X of Figure 9; and

Figure 11 is a cross-sectional view taken on line XI—XI of Figure 1;

As shown on the drawings:

Referring to Figure 1, the reference numeral 15 indicates a heat treating apparatus adapted for surface hardening lengthy bar stock or the like. The apparatus 15 is shown as comprising three main units which shall hereafter be referred to as a loading table 16, an inductor unit 25 and an unloading apparatus 60.

Briefly, the operation of the apparatus is carried out by unloading a bundle of bar stock onto the side of the loading table 16, after which, an operator feeds one piece of stock at a time into the inductor unit 25 wherein the stock is heated and quenched for surface hardening. The bar is then received by the unloading device 60 and is automatically dumped into a storage receptacle or cradle for subsequent disposition.

Referring specifically to Figures 1 and 11, the loading table 16 is shown as including a plurality of bent rails 17 arranged in spaced longitudinal alignment with the ends of the rails fastened with suitable nuts and bolts on an I beam support 18 which, in turn, is mounted on a plurality of pedestals 19 situated on the machine room floor. The opposite ends of the rails 17 are suitably secured to a slide conveyor comprising a pair of channel beams 20 mounted on a plurality of pedestals 19. The channels 20 also carry a plurality of spaced rollers 21 which may be rotatably mounted on the upper flanges of the channels as, for example, by U bolts 22. The slide conveyor is further provided with a back stop 23 which may include a hardened face insert 23a to minimize the wearing effect due to the abrasive contact of the back stop with the bar stock.

As will be evident from the drawings, the bundle of bar stock to be hardened may be piled upon the rail 17, and the operator may then pull one bar at a time onto the rollers 21 after which the operator may propel the bar toward the inductor unit 25 by hand.

Referring specifically to Figures 3 and 4, the inductor unit 25 is shown with a piece of bar stock S in place as it passes through the inductor unit 25.

As the stock S moves from left to right (using the planes of reference of the drawings), it is introduced into an entry guide roll support 26 which retains the stock against relative movement in a horizontal plane transverse to the longitudinal axis of the apparatus.

The guide roll support 26 comprises an adjustably mounted guide roll support member 26a which carries thereon a pair of guide rolls 27o. A pair of complementary guide rolls 27i are mounted on the frame portion 26d. The guide rolls 27o are arranged to be adjustably spaced from guide rolls 27i by actuating a hand wheel 26b keyed to an adjusting screw 26c. The screw 26c is threadedly engaged by a split enclosure 26d which is rigidly assembled to the frame 25a of the inductor unit.

After passing through the entry guide rolls 27o and 27i, the stock S is engaged by a driving mechanism comprising a drive roll 29 and a cooperating pinch roll 28.

The frame 25a is suitably fabricated to define a lower gear casing and is capped by a flange head member 30 secured to the lower gear casing, as for example, by a plurality of nuts and bolts.

As may best be seen on Figure 8, the pinch roll 28 is pivotally mounted on the frame portion 30. More specifically, the frame portion 30 includes a boss 30a which carries a stub shaft 28a. An outside idler roll arm 28b and an inside pinch roll arm 28c are pivotally mounted on the stub shaft 28a.

As may be seen on Figures 3 and 4, the idler roll arms pivot about the axis of the shaft 28a and are retained in transverse assembly by a cap secured to the shaft 28a by a plurality of cap screws.

The pinch roll arms 28b and 28c are each further equipped with an upstanding arm portion 28d having formed therein suitable slots for receiving a spring retainer 31. Each of the retainers 31 is threaded on one end to receive a nut which may be tightened to place the retainer 31 in firm assembly with the upstanding arm 28d.

A pair of compression springs 32 are seated on the retainers 31 and are confined at their opposite ends by an adjustable bolt assembly comprising a pair of spring retainer collars 33 surrounding a retainer bolt 34. The bolt assembly is held in adjustable longitudinal assembly by two pairs of hex nuts 35 threaded onto the bolt 34.

The pinch roll arms 28b and 28c each receive on their free ends a pinch roll 36 suitable for rotatable engagement with the bar stock S. Thus, it should be apparent that the pinch roll 28 may be adjusted so as to be subjected to a desired predetermined spring biasing effect, thereby operating to urge the stock S against the drive roll 39, and thus advance the stock S. It will also be observed that the pinch rolls 36 in cooperation with the drive rolls 39 provides vertical guidance and alignment to the stock S.

The drive unit 29 is best viewed in Figures 3, 4 and 8 wherein the frame 25a is shown to be formed so as to define a plurality of suitable bearing housings 25b for receiving suitable bearings. The housings 25b further define conventional means for receiving suitable retainer rings and sealing devices therein, the details of which are not essential to this disclosure and are not shown on the drawings. Rotatably seated in each pair of opposing bearing housings 25b is a drive shaft 29a.

Each of the shafts 29a is provided with a helical gear 29b which meshes with one of a plurality of gears 37 affixed upon a power shaft 38 (Figure 8) and is further provided on its outer extremity with a key slot (not shown) suitable for keying a hardened steel drive roll 39 to the shaft 29a.

As may be seen on Figure 4, the driver 29 is constructed so as to place the drive shafts 29a, and thus the drive rolls 39, in spaced aligned registry with the pinch rolls 36, thereby insuring that the stock S is intimately contacted by the drive rolls 39.

It should be noted that the bearing housings 25b are provided with a pair of ears 25c which project generally toward each other and which may be drilled and tapped to receive a pair of bolts 40 with hex nuts threaded thereon. The bolts 40 may be adjustably rotated to establish a lower limit past which the idler roll arms 28b, and 28c cannot go, thereby permitting free ingress of the stock S between the drive rolls and the pinch rolls.

As may be seen on Figures 3 and 4, the power shaft 38 is connected to a suitable prime mover M through a conventional coupling mechanism indicated generally at 38a.

After the stock S has left the drive roll unit, it is further supported and guided by a second guide roll support which is identical to the guide roll support 26 except that it acts as an exit guide. For the sake of clarity and convenience, like numbers have been applied to like parts in connection with the exit guide roll support structure.

Referring further to Figures 3, 4 and 8, inductor unit 25 is shown as including an auxiliary frame 41 fabricated to form an end member 41a and a bottom channel 41b. The end member 41a may be drawn up in bolted assembly with the bearing housings 25b, thereby serving as a cover plate for the bearing housings and further serving to hold the auxiliary frame 41 in firm longitudinal assembly with the inductor unit 25.

Situated on the free end of the channel 41b is a transformer indicated generally as 42. Referring specifically to Figures 3, 8, 9 and 10, the transformer 42 is shown as comprising a one-turn secondary 42a formed from a single sheet of copper and a primary 42b formed of copper tubing.

The secondary 42a does not form a completely closed cylinder in that a strip of insulating material 43 is inserted between the free ends of the copper sheet (Figure 10). A pair of brass blocks 44 extend vertically from end-to-end of the secondary 42a and are affixed to the free ends of the copper sheet. The blocks 44 not only serve as the terminal portions of the one-turn secondary, but are also drilled to serve as headers for a water cooling arrangement presently to be described.

The induction heating coil 45 employed to surface harden the stock S is formed by a single turn of copper tubing directly connected to the terminal blocks 44 in a conventional manner by means of water-tight nipple joints. As may best be seen in Figure 8, the coil 45 is shaped to follow the exact contour defined by the particular cross-section of the bar stock S. While a single turn heating coil has been illustrated, it will be understood that a coil having more than one turn may be used. In this connection, however, it has been found that the axial dimension of the coil should preferably be short and the cross-section of the coil conform to the cross-sectional shape of the bar stock to be treated. Thus, the coil should be closely but uniformly spaced from the surface of the stock to be treated. Cooling water from the headers passes through the coil 45 and maintains the coil at suitable operating temperature.

The transformer secondary 42a is cooled by water passing through a plurality of square copper tubes 46 surrounding the secondary 42a of the transformer. The tubes 46 are attached directly to the copper sheeting which forms the secondary 42a in any suitable manner, as for example, by brazing. Opposite ends of the tubes are connected respectively to the headers 44. Water is circulated into one header 44 and out the other through hose connections 44a and 44b.

The primary 42b comprises a continuous piece of hollow copper tubing and is wound to form a helix. The free ends of the primary extend upwardly and may be connected to any suitable source of circulating water (not shown), thereby permitting free flow of cooling water through the primary tubing. The primary 42b is, of course, suitably energized by a suitable source of alternating electric energy.

The transformer construction is completed by drawing up a cover plate 48 and a bottom plate 49 on a center bolt 47 passed through the center of the transformer. The cover plate 48 and the bottom plate 49 preferably take a disk-like form and are made of a high dielectric material. The plates 48 and 49 may be preformed to define suitable seating grooves for receiving the circular secondary 42a.

As is indicated generally on Figure 9, the reference numeral 50 is used to refer to a transformer filler material, inasmuch as it is desirable that the transformer be filled with a suitable material, such as paraffin or sealing wax, in accordance with conventional practice.

The transformer 42 is mounted on a floating sub-base comprising a plate 51 made of a hard rubber sheet material, or the like, and a pair of elastic shoes 52 made of soft resilient sponge rubber. The transformer is positioned and held upon the bracket plate 51 by a plurality of clips 53 and the bracket plate 51, in turn, rests upon the elastic shoes 52 which are pre-positioned upon the channel 41b with a plurality of bolts which pass through the body of the channel and the shoes.

On the inside extremity of the base plate 51, a pair of guide blocks 54 extend upwardly so as to lie adjacent both sides of the heating coil 45. The guide blocks are made of hard molded rubber, or the like, and are provided with openings having wear-resistant bronze bushings 54a inserted therein. The blocks are so arranged as to have the axes of the openings lie on substantially the longitudinal center line axis of the traveling bar stock S, thereby providing an entry guide and an exit guide.

Each of the bushings 54a is shaped so as to have the cross-section of its length follow the exact contour of the stock S, thus it should be evident that as the stock passes through the inductor unit 25, the guide blocks 54, because of their intimate relation with the stock, will cause the plate 51 to follow any slight irregularities in the stock and thus maintain the heating coil 45 in correct alignment with the stock at all times. It will thus be understood that by mounting the guide blocks, the transformer, and the heating coil on a single floating base, a uniform heating effect is obtained irrespective of irregularities in the stock. It will also prevent the coil 45 from short circuiting itself by contact with the stock S.

As may be seen on Figures 3 and 4, quenching in the present surface hardening apparatus is accomplished by means of a quenching unit comprising three longitudinally spaced ring tubings 55a, 55b and 55c. As may be most clearly seen in Figures 5 and 6, each tubing consists of a ring of hollow rust-resistant material and each ring has four acutely inclined nozzles 55d which project inwardly so as to include a complete periphery. The tubings 55a, 55b and 55c are further equipped with an outwardly projecting nipple, or other suitable connection, which may be associated with a suitable circulating water conduit 55e.

Turning now to Figures 1 and 2, the unloading device 60 is shown as being located adjacent the inductor unit 25 for receiving the bar stock S after it has been surface hardened. The unloading device 60 comprises a tilting delivery table indicated generally as 61 and a bundle table 62.

The tilting delivery table 61 is mounted on a lengthy shaft member 63 which is rotatably supported by a plurality of brackets 68 bolted to a plurality of suitable piers 64 arranged in spaced longitudinal alignment upon the machine room floor. Along the length of the shaft 63, a series of free turning rollers 65 are arranged in spaced relationship. Individual rollers are each pivotally mounted on the upstanding legs of a pair of stringers 66 which, by way of example, may take the form of angle irons. The stringers 66 are carried upon the horizontal legs of a plurality of L-shaped bracket supports 67 keyed to the shaft 63. Each of the brackets 67 is held in firm assembly with the shaft 63 in a conventional manner and may be secured to the body of the bracket by nuts and bolts, or other suitable retaining means.

Referring specifically to Figure 2, a hydraulic tilter 69 is shown mounted on an extension of one of the piers 64. The tilter 69 comprises a cylinder 69a providing a bore for accommodating a piston which acts upon a piston rod 69b. The piston rod 69b has a cap 69c which is pivotally connected with a lever arm 70 which, in turn, is keyed to the shaft 63 and held in firm assembly therewith. The cylinder 69a has a pivotal point at its juncture with a mounting plate 71 affixed to the pier, thereby permitting eccentric movement of the tilter device.

It should be readily apparent that as the piston is displaced in the cylinder 69a, the piston rod 69b will be actuated upwardly, thereby causing the lever arm 70 to move to its dotted line position shown in Figure 2, and rotating the shaft 63 through a determinable angular displacement.

A leading edge is formed on the tilting delivery table 61 by an angle iron 72 which is suitably attached to the outside stringer 66 and is arranged to lie flush with the plane of reference defined by the successively spaced rollers 65.

When the tilter 69 operates to rotate the shaft 63, the L brackets 67 are carried along to the dotted line position shown in Figure 2, and the angle iron 72 forms a continuous sliding surface with the bundle table 62 about to be described.

The bundle table 62 comprises a series of cradle structures which are spaced longitudinally along the length of the tilting delivery table. As shown in Figure 2, each individual cradle unit of the bundle table includes a horizontally disposed H type steel beam 73 having suitable flange supports 73a welded in place between the webs thereof at several points along its length. The beam 73 may be secured to the machine room floor in any suitable manner, as for example, by a plurality of heavy drawbolts.

Positioned upon each beam 73 is a receptacle structure fabricated in a suitable manner to define a cradle. As shown on Figure 2, the present structure is made up of a plurality of channel irons 74, the longest of which being acutely inclined and supported by an upstanding strut 75 to define an angle corresponding to that defined by the downwardly tilted delivery table. Securely bolted within the channels are shaped pieces of suitably drilled and counterbored hard wood 76. Thus, the bar stock may freely slide into the cradle support without suffering any deleterious effects as a result of impact. A pair of gusset plates 77 are welded in place to adequately support the corner of the cradle structure.

The tilting delivery table 61 is provided with suitable automatic trip and limit switches (not shown) which cause the hydraulic tilter 69 to be actuated as soon as a piece of bar stock is received upon the table. It should be apparent that the entire delivery table 61 tilts downwardly away from and below the directional axis of the bar stock. This feature is particularly desirable in that it permits the bar stock to slide down the incline provided by the leading edge of the tilting delivery table 61 and into the cradle, but yet the table structure does not interfere with the progressive movement of the next bar of stock which, in the meantime, has moved along a portion of the length of the tilting delivery table.

After a number of bars have been received in the cradle, an entire bundle of bars may be removed with great facility, as for example, by an overhead crane.

*Operation characteristics*

It is well known that iron and steel are not simple homogeneous substances, like glass, but are composed of grains and crystals of different constituents like graphite, cementite, ferrite and pearlite. A simple steel having favorable strength characteristics consists largely of pearlite.

It is also well known that the crystalline or grain structure of steel can be selectively varied by means of controlled recrystallization. This art is known as the science of heat treating and hardening.

In one method of surface hardening, commercially known as the "tocco" process, the steel object to be hardened is inserted within an induction coil and is heated rapidly to above the critical range by turning on the primary current. The high frequency current heats the object in a few seconds after which the object is quenched with water sprays to produce the desired hardening effect.

The rationale of the process is that the steel, when heated above the critical range, is completely transformed into austenite. The rapid cooling permits some martinsitic or troositic structure resulting from the imperfectly transformed austenite to remain in the cooled material.

The method of heat treatment performed in accordance with the present invention and with the mechanical structures disclosed in this invention employs the transformer 42 which preferably has a 50 k. w. capacity and an output of approximately 450 kilocycles. The transformer 42 increases the heating current in proportions of roughly 5 to 1. Thus, when lengthy bar stock is exposed to the inductive heating process by passing the stock through the coil 45, eddy current penetration of the bar stock occurs in accordance with the principles of the so-called Steinmetz law. Under normal operating conditions, eddy current penetration of the bar stock in the presently disclosed method of surface hardening amounts to about 17 mils.

In a normal operation, one-inch bar stock is fed through the inductor unit 25 at approximately the rate of 6 to 8 linear feet per minute. However, attention is drawn to the fact that the depth of the penetration of hardening is varied only by varying the speed of linear travel of the bar stock, inasmuch as the frequency of the electric current in the heater coil 45 is held constant.

Attention is invited to Figure 7 where an etched cross-section of a one-inch quarter octagon plain carbon hollow drill 80 is shown after the drill has been surface hardened in accordance with the teachings of the present invention. The particular stock herein shown in etched cross-section was moved through the inductor unit at the rate of 6.8 feet per minute and, in accordance with an actual measurement made upon a sample, the hardened layer or "hardness penetration" averaged 0.019 inch on the middle of the sides 81 and 0.025 inch on the middle of the corners 82. The extent of the heated zone can be so closely controlled in the present apparatus that the fillet of the stock remains comparatively soft while the bearing surface is considerably hardened, thereby reducing the possibility of fatigue failure without sacrificing wear resistance.

Since the manner of quenching controls the rate of cooling and thus the effect of hardening, attention is further invited to the peculiar arrangement of the quenching unit tubings 55a, 55b and 55c. The initial quenching caused by the water emanating from the tubing 55a is accomplished almost as soon as the stock has been heated above the critical range by the coil 45. However, residual heat tends to reheat the quenched surface, therefore, the subsequent tubings 55b and 55c are arranged in a predetermined spaced relationship so as to avoid the possibility of reheating the stock past the critical value once it has been quenched. In other words, the stock must be cooled with sufficient rapidity so that the grain structure transformation near the surface will not have taken place before the stock is brought to a normal atmospheric temperature. The present quenching arrangement, therefore, maintains the critical cooling rate for successful surface hardening of elongated bar stock.

While I have shown a particular embodiment of my invention and have resorted to detail in the description of my novel process for the sake of clarity, it will, of course, be understood that I do not wish to be limited to the details herein contained, since many modifications may be made with respect to various elements without departing from the spirit of my invention. I desire to be limited, therefore, only by the scope of the appended claims and the prior art.

I claim as my invention:

1. Apparatus for surface hardening bar stock comprising a frame, a floating base mounted on said frame, guide means carried by said floating base, and an induction heating coil carried by said floating base and through which the stock is arranged to travel, said guide means operable to respond to irregularities in the straightness of said stock, whereby said coil remains in fixed spaced relationship to said stock irrespective of irregularities in the straightness of said stock.

2. Apparatus for surface hardening bar stock comprising a frame, a floating base mounted on said frame, guide means carried by said floating base, an induction heating coil mounted on said floating base in fixed relation to said guide means, said induction heating coil shaped to conform to the cross-sectional configuration of said stock and being slightly larger than said cross-sectional configuration, and means to pass said stock through said coil, said guide means and said floating base operable to maintain said coil in fixed spaced relationship to said stock irrespective of irregularities in the straightness of said stock.

3. An induction heater for heating metal bar stock supported for travel along a defined substantially horizontal path, comprising: an induction coil through which the bar stock is adapted to pass to be heated thereby, a floating support for the induction coil for holding the same in predetermined position relative to the bar stock passing therethrough, said support including a guide means adapted to slidingly receive the bar stock, said guide means operable to move up and down through variation in the bar stock passing therethrough so as to automatically and continuously control the position of the coil relative to the bar stock passing therethrough; and means for holding said floating support against motion in the direction of travel of said bar stock.

ROY H. DAVIS.

REFERENCES CITED

The following references are of record in the file of this patent:

UNITED STATES PATENTS

| Number | Name | Date |
|---|---|---|
| 1,359,195 | Piercy | Nov. 16, 1920 |
| 1,394,044 | Stephens | Oct. 18, 1921 |
| 1,646,498 | Seede | Oct. 25, 1927 |
| 2,032,738 | Cramer et al. | Mar. 3, 1936 |
| 2,086,160 | Gotthard | July 6, 1937 |
| 2,166,608 | Postlewaite | July 18, 1939 |
| 2,166,609 | Putnam | July 18, 1939 |
| 2,194,125 | Rinehart | Mar. 19, 1940 |
| 2,202,759 | Denneen et al. | May 28, 1940 |
| 2,223,902 | Somes | Dec. 3, 1940 |
| 2,280,064 | Denneen et al. | Apr. 21, 1942 |
| 2,325,638 | Strickland | Aug. 3, 1943 |
| 2,328,225 | Morey | Aug. 31, 1943 |
| 2,347,639 | Platt | Apr. 25, 1944 |
| 2,360,661 | Eddy | Oct. 17, 1944 |
| 2,366,290 | Rudd | Jan. 2, 1945 |
| 2,371,090 | Westin et al. | Mar. 6, 1945 |
| 2,385,904 | Witty | Oct. 2, 1945 |
| 2,401,899 | Bierwirth et al. | June 11, 1946 |
| 2,417,678 | Cox | Mar. 18, 1947 |
| 2,426,095 | Hecker | Aug. 19, 1947 |
| 2,427,485 | Wilson | Sept. 16, 1947 |
| 2,459,507 | Denham | Jan. 18, 1949 |
| 2,461,323 | Hille | Feb. 8, 1949 |

FOREIGN PATENTS

| Number | Country | Date |
|---|---|---|
| 617,533 | Great Britain | Feb. 8, 1949 |
| 620,432 | Great Britain | Mar. 24, 1949 |
| 621,081 | Great Britain | Apr. 4, 1949 |